United States Patent

Yang

(10) Patent No.: US 9,501,153 B2
(45) Date of Patent: Nov. 22, 2016

(54) TIME ADJUSTING METHOD AND SYSTEM FOR WRISTWATCH

(71) Applicant: Princo Middle East FZE, Dubai (AE)

(72) Inventor: Chih-kuang Yang, Hsinchu (TW)

(73) Assignee: PRINCO MIDDLE EAST FZE, Dubai (AE)

( * ) Notice: Subject to any disclaimer, the term of this patent is extended or adjusted under 35 U.S.C. 154(b) by 47 days.

(21) Appl. No.: 14/230,686

(22) Filed: Mar. 31, 2014

(65) Prior Publication Data

US 2015/0205361 A1 Jul. 23, 2015

(30) Foreign Application Priority Data

Jan. 22, 2014 (TW) .............................. 103102331 A

(51) Int. Cl.

| G04C 9/00 | (2006.01) |
|---|---|
| G04G 5/00 | (2013.01) |
| G04G 21/00 | (2010.01) |
| G06F 1/16 | (2006.01) |
| G06F 3/01 | (2006.01) |
| G06F 3/042 | (2006.01) |
| G06F 3/03 | (2006.01) |

(52) U.S. Cl.
CPC ................. *G06F 3/017* (2013.01); *G04C 9/00* (2013.01); *G04G 5/00* (2013.01); *G04G 21/00* (2013.01); *G06F 1/163* (2013.01); *G06F 1/1686* (2013.01); *G06F 3/0304* (2013.01); *G06F 3/042* (2013.01)

(58) Field of Classification Search
CPC .......... G04C 9/00; G04G 5/00; G04G 21/00; G04G 21/08; G06F 3/017; G06F 1/163; G06F 1/1686; G06F 3/042; G06F 3/0304
USPC ............ 368/10, 69, 187; 345/156, 158, 173, 345/175
See application file for complete search history.

(56) References Cited

U.S. PATENT DOCUMENTS

| 5,247,284 | A | * | 9/1993 | Fleming | G06F 3/04817 345/156 |
|---|---|---|---|---|---|
| 5,583,833 | A | * | 12/1996 | Capps | G04G 5/00 368/10 |
| 6,868,046 | B2 | * | 3/2005 | Farine | G04G 21/08 368/187 |
| 6,873,575 | B2 | * | 3/2005 | Yamazaki | G04B 47/00 348/373 |
| 7,065,718 | B2 | * | 6/2006 | Lection | G06F 3/04847 345/179 |
| 7,420,881 | B2 | * | 9/2008 | Frenkel | G06F 1/3228 345/169 |
| 7,932,893 | B1 | * | 4/2011 | Berthaud | G04G 21/00 178/18.06 |
| 8,279,716 | B1 | * | 10/2012 | Gossweiler, III | H04M 1/72552 368/10 |
| 8,854,433 | B1 | * | 10/2014 | Rafii | G06F 3/017 348/42 |
| 2001/0017663 | A1 | * | 8/2001 | Yamaguchi | H04N 1/00249 348/373 |
| 2002/0131331 | A1 | * | 9/2002 | Molander | G06F 3/04847 368/82 |
| 2002/0180586 | A1 | * | 12/2002 | Kitson | G06F 21/32 340/5.82 |
| 2006/0170649 | A1 | * | 8/2006 | Kosugi | G04G 21/08 345/156 |
| 2008/0089587 | A1 | * | 4/2008 | Kim | G06F 3/017 382/190 |
| 2008/0186808 | A1 | * | 8/2008 | Lee | G04G 5/04 368/10 |

(Continued)

*Primary Examiner* — Vit W Miska
(74) *Attorney, Agent, or Firm* — Hauptman Ham, LLP

(57) ABSTRACT

The present invention provides a time adjusting method and system for a time piece (such as a wristwatch), which utilizes a motion sensor disposed on the wristwatch to detect a hand gesture made by a user in the front of the wristwatch. In such a manner, adjusting the position of an indicator on the wristwatch is realized, and thereby carrying out the time adjustment.

17 Claims, 4 Drawing Sheets

(56) References Cited

U.S. PATENT DOCUMENTS

| | | | |
|---|---|---|---|
| 2008/0273755 A1* | 11/2008 | Hildreth | G06F 1/1626 382/103 |
| 2009/0059730 A1* | 3/2009 | Lyons | G04G 21/04 368/69 |
| 2009/0199130 A1* | 8/2009 | Tsern | G04G 21/08 715/810 |
| 2010/0159981 A1* | 6/2010 | Chiang | G06F 3/017 455/556.1 |
| 2011/0310708 A1* | 12/2011 | Chen | G04G 5/00 368/46 |
| 2012/0140599 A1* | 6/2012 | Liao | G04G 13/02 368/9 |
| 2012/0169670 A1* | 7/2012 | Kim | G06F 3/017 345/175 |
| 2015/0062004 A1* | 3/2015 | Rafii | G06F 3/017 345/156 |
| 2015/0078138 A1* | 3/2015 | Ito | G07C 1/10 368/9 |

* cited by examiner

TIME ADJUSTING METHOD AND SYSTEM FOR WRISTWATCH

CROSS-REFERENCE TO RELATED APPLICATION

This application claims priority from and the benefit under 35 U.S.C. §119(a) of Taiwanese Patent Application No. 103102331, filed on Jan. 22, 20143 in the TIPO (Taiwan Intellectual Property Office), which is hereby incorporated by reference for all purposes as if fully set forth herein.

TECHNICAL FIELD OF THE INVENTION

The present invention relates to an electric mechanical clock, and more particularly, to a time adjusting method and system for a wristwatch.

BACKGROUND OF THE INVENTION

An electric mechanical watch uses a motor driven by the electric power to actuate physical hands on a clock to indicate time information. The electrical mechanical watch keeps the hand design basically as the same as a mechanical watch, which is a sign of good taste. However, the electrical mechanical watch is much cheaper, thereby becoming a mainstream in the watch market. The time adjusting approach used in conventional electric mechanical watches is to rotate crowns so as to actuate the hands and thus change their positions. However, for a complex watch, there are many indicators (or hands) on a dial and the number of the crowns has to be increased correspondingly. Therefore, as to a wristwatch having a complex dial, not only the difficulty in designing a mechanism for the time adjustment is increased, but also it is very inconvenient for a user to adjust the time by using a great amount of crowns.

SUMMARY OF THE INVENTION

An objective of the present invention is to provide a time adjusting method and system for a wristwatch, for adjusting the positions of indicators in an intuitive and convenient way.

To achieve the above objective, the present invention provides a time adjusting method for a wristwatch, which comprises a time circuit, one or more indicators disposed on a dial of the wristwatch, and a driver connected to the indicator, the indicator being actuated by the driver according to a control signal outputted from the time circuit, said time adjusting method comprising: detecting a hand gesture made by a user in the front of the wristwatch; and outputting a signal corresponding to the band gesture made by the user for adjusting the position of the indicator.

In another aspect, the present invention provides a time adjusting system for a wristwatch, which comprises a time circuit, one or more indicators disposed on a dial of the wristwatch, and a driver connected to the indicator, the indicator being actuated by the driver according to a control signal outputted from the time circuit, said time adjusting system comprising: a motion sensor disposed on the wristwatch, for detecting a hand gesture made by a user in the front of the wristwatch and outputting a signal corresponding to the hand gesture made by the user for adjusting the position of the indicator.

The time adjusting system and method of the present invention provides an intuitive and convenient way to adjust the positions of the indicators, thereby adjusting the time indicated by the indicators. Compared to the time adjusting approach used in conventional electric mechanical wristwatches, the present invention can reduce the burden of time adjustment for a complex dial, and is indeed a creative invention. Moreover, an electric mechanical wristwatch implemented according to the present invention does not need a button for the time adjustment, and accordingly, is attractive in the emulated mechanical watch market.

BRIEF DESCRIPTION OF THE DRAWINGS

FIG. 3A is a schematic diagram showing a finger rotated clockwise.

DETAILED DESCRIPTION OF THE INVENTION

The present invention provides a time adjusting method and system for a time piece (such as a wristwatch). The basic concept of the invention is to dispose a motion sensor on the wristwatch such that it is able to detect a hand gesture made by a user in the front of the wristwatch and transform various hand gestures into control signals corresponding thereto. In such a manner, adjusting the position of an indicator arranged on the wristwatch is realized, and thereby carrying out the time adjustment.

Figure 1:
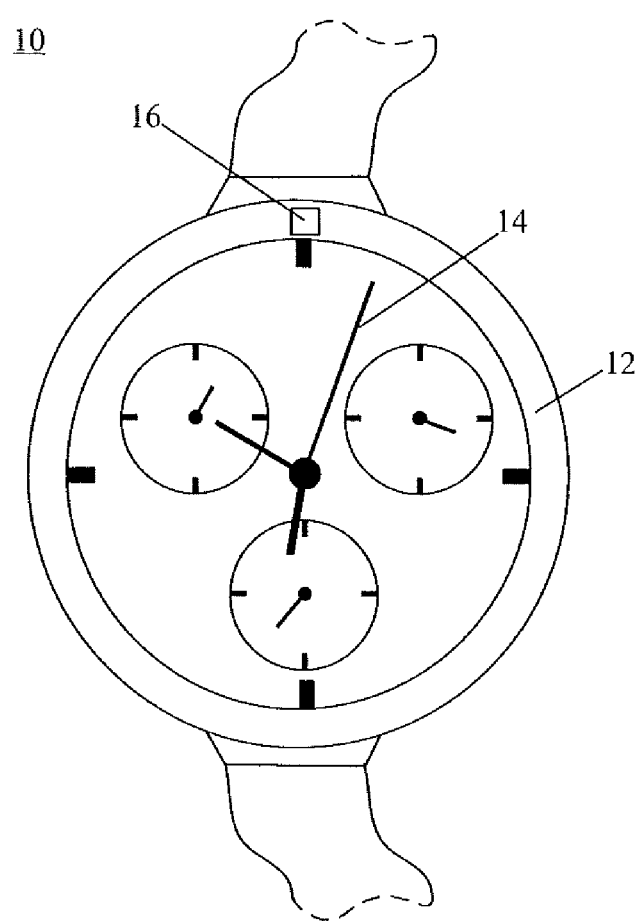
FIG. 1 is a schematic diagram showing a wristwatch implemented according to the present invention.

Please refer to FIG. 1. A wristwatch having complicated functions usually has a plurality of indicators 14 disposed on a dial 12 thereof. Generally, main indicators are used to indicate time information such as hours, minutes, and seconds, and indication of secondary indicators may be a date, a moon phase, or may be elapsed time measured by a chronograph.

Usually, an electric mechanical wristwatch has a time circuit (see FIG. 4) and a plurality of drivers or driving motors (see FIG. 4) disposed therein. The driving motors are disposed respectively corresponding to the indicators 14. A driving motor is usually connected to one corresponding indicator. Under normal circumstances, the driving motor actuates the corresponding indicator based on a control signal outputted by the time circuit such that the indicator moves in a circle or along a straight line.

As shown in FIG. 1, a wristwatch 10 implemented according to the present invention has a motion sensor 16, which has a camera disposed on the dial 12 of the wristwatch 10. The camera is used to capture an image of a hand gesture made by a user in the front of the wristwatch 10. The motion sensor 16 can output different electronic signals in response to various types of hand gestures and make the wristwatch 10 enter different modes.

For example, in order to adjust the positions of the indicators, the present invention provides three types of hand gestures for the wristwatch having complicated functions. The first hand gesture can make the wristwatch settle in a selection mode so as to specify an indicator for the adjustment. The second hand gesture can adjust the position of the specified or selected indicator, and meanwhile the wristwatch is settled in an adjustment mode. The third hand gesture can make the wristwatch back to the normal state, i.e., a normal mode.

Figure 2:
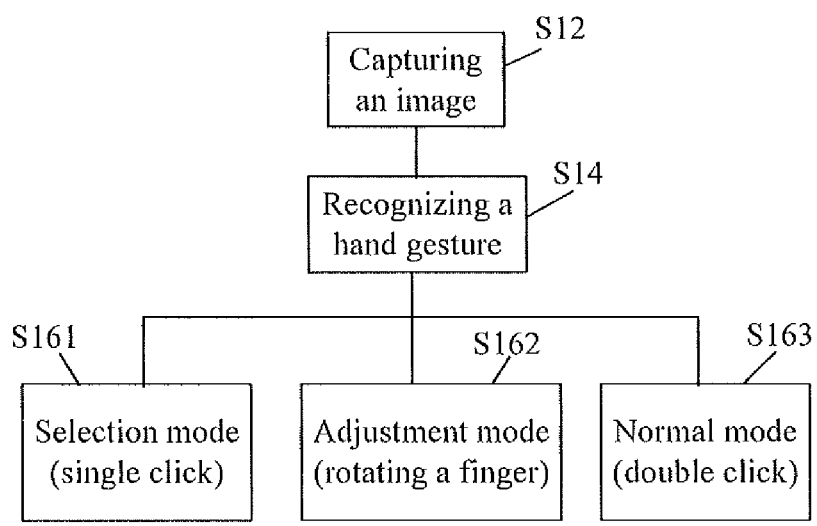
FIG. 2 is a flow chart of a time adjusting method for a wristwatch according to the present invention.

FIG. 2 is a flow chart of a time adjusting method for a wristwatch according to the present invention. The time adjusting method comprises the following steps. Firstly, the camera of the motion sensor is utilized to capture an image of a hand gesture (Step S12). Next, the motion sensor proceeds to do image recognition for the image captured by the camera (Step S14), in which the motion sensor compares the captured image of the hand gesture with the hand gesture data built in the system and then outputs a signal corresponding to the specific hand gesture.

In Step S161, when a user makes the aforesaid first hand gesture (for example, a single click) at the wristwatch, the motion sensor outputs a signal so as to make the wristwatch settle in a selection mode. For example, when the user clicks on one of the indicators on the dial of the wristwatch, the specified or selected indicator is set to an adjustable state, and meanwhile the user is able to adjust the selected indicator so as to adjust the time. That is to say, the motion sensor can recognize the respective hand gestures the user's finger clicks on the respective indicators, and thereby determining which indicator the click made by the user is directed to. In another example, the click gesture made by the user is a switch operation. Another indicator will be selected each time the user makes a click gesture, and by this way, the selection of indicator is achieved.

Figure 3B:
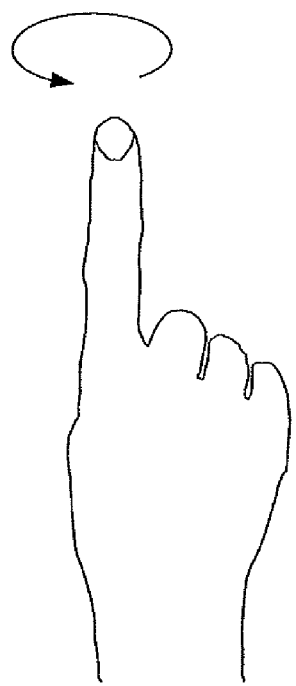
FIG. 3B is a schematic diagram showing a finger rotated counterclockwise.

In Step S162, when the user makes the aforesaid second hand gesture (for example, whirling or rotating his/her finger) at the wristwatch, the motion sensor outputs a signal so as to make the indicator of the wristwatch settle in an adjustment mode. For example, when the user rotates his/her finger clockwise (as shown in FIG. 3A) at the dial of the wristwatch, the indicator will rotate along the clockwise direction. When the user rotates his/her finger counterclockwise (as shown in FIG. 3B) at the dial of the wristwatch, the indicator will rotate along the counterclockwise direction. The position of the indicator is adjusted by this way, and thereby adjusting the time. In another example, when the user makes a gesture of whirling or rotating his/her finger (clockwise or counterclockwise), the indicator will rotate along the same direction. Except for whirling or rotating the finger, a gesture of moving the finger left and right (or up and down) may also be utilized to make the indicator rotate or move along a straight line so as to change its position.

In Step S163, when the user makes the aforesaid third hand gesture (for example, a double click) at the wristwatch, the motion sensor outputs a signal so as to make the indicator of the wristwatch settle in a normal mode. Specifically, when the user double clicks on the dial of the wristwatch, the motion sensor outputs the signal so as to inform the time circuit to control the driving motor (or the driver), and meanwhile the indicator is back to its normal motion to indicate the time.

In one embodiment, the position of one indicator is allowed to be adjusted only after the one indicator is selected by a single click gesture made by the user. In another embodiment, the position of a predetermined indicator (such as one of the aforesaid main indicators) is directly adjusted when the user makes a gesture of rotating his/her finger. If a single click gesture is made after that, another indicator will be selected for the position adjustment.

In addition, although the afore-mentioned examples are illustrated by plural indicators, the present invention is not limited thereto. That is, the present invention is also applicable to a wristwatch having only one indicator.

Figure 4:
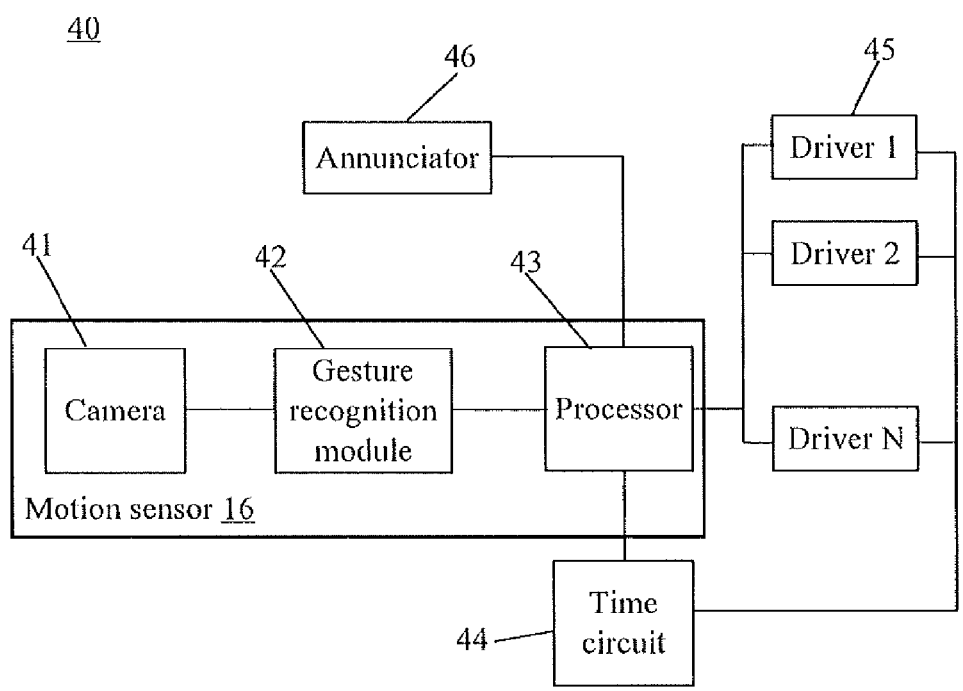
FIG. 4 is a schematic diagram showing a time adjusting system for a wristwatch according to the present invention.

FIG. 4 is a schematic diagram showing a time adjusting system for a wristwatch according to the present invention. The time adjusting system 40 comprises the motion sensor 16, the time circuit 44, and the drivers (or driving motors) 1-N 45 described above, and an annunciator 46. Further, the motion sensor 16 comprises a camera 41, a gesture recognition module 42, and a processor 43.

The camera 41 is disposed on the dial of the wristwatch and is used to capture images. Specifically, the camera 41 is used to capture an image of a hand gesture made by a user in the front of the wristwatch. The camera 14 has a short-focus lens and its focus length is preferable to be 5 to 10 cm. The gesture recognition module 42 receives the image captured by the camera 41. The gesture recognition module 42 will compare the captured image with the hand gesture data built in the system so as to recognize the hand gesture the user makes at the wristwatch and output a signal corresponding to the recognition result. The processor 43 is connected to the gesture recognition module 42. The processor 43 is used to output signals to the time circuit 44, the driver (or driving motor) 1-N 45, or the annunciator 46 based on the recognition result outputted from the gesture recognition module 42. The time circuit 44 can output control signals to the driving motors 1-N 45 so as to make the driving motors actuate the indicators based on the control signals. The annunciator 46 is used to prompt the user to proceed related operations.

The operation principles of the time adjusting system 40 of the present invention are as follows. When a user makes a first hand gesture in the front of the wristwatch, for example, the user makes a click gesture at one of the indicators on the dial of the wristwatch, by using the image captured by the camera 41 the gesture recognition module 42 will recognize such a click gesture and determine which indicator the click gesture is made at. After receiving the recognition result from the gesture recognition module 42, the processor 43 will output a signal to the annunciator 46 such that the annunciator 46 conveys to the user which indicator is currently selected. The annunciator 46 may prompt the user by light rays (such as using a LED) or a sound.

Next, when the user makes a second hand gesture at the wristwatch, for example, the user makes a gesture of whirling or rotating his/her finger at the dial of the wristwatch, the processor 43 will transmit an interruption signal to the time circuit 44, and based on the interruption signal, the time circuit 44 will stop controlling the driving motor 45 corresponding to the selected indicator. Meanwhile, the processor 43 outputs a signal to the driving motor 45 corresponding to the selected indicator so as to adjust the position of the selected indicator, and thereby adjusting the time.

Finally, when the user makes a third hand gesture, for example, the user double clicks on the dial of the wristwatch, the processor 43 will stop transmitting the interruption signal to the time circuit 44. Meanwhile, the time circuit 44 retrieves the control of the driving motor 45 corresponding to the selected indicator, and the selected indicator is back to the normal motion.

The time adjusting system and method of the present invention provides an intuitive and convenient way to adjust the positions of the indicators, thereby adjusting the time indicated by the indicators. Compared to the time adjusting approach used in conventional electric mechanical wristwatches, the present invention can reduce the burden of time adjustment for a complex dial, and is indeed a creative invention. Moreover, an electric mechanical wristwatch implemented according to the present invention does not need a button for the time adjustment, and accordingly, is attractive in the emulated mechanical watch market.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A time adjusting method for an electric mechanical wristwatch, which comprises a time circuit, one or more physical indicators disposed on a dial of the electric mechanical wristwatch, and a driving motor connected to the one or more physical indicators, the one or more physical indicators being actuated and rotated by the driving motor according to a control signal outputted from the time circuit, said time adjusting method comprising:
   detecting, by a motion sensor having a camera disposed on the electric mechanical wristwatch, a hand gesture made by a user in the front of the electric mechanical wristwatch; and
   outputting a signal corresponding to the hand gesture made by the user for adjusting a position of the one or more physical indicators.

2. The method according to claim 1, wherein when the user makes a first hand gesture at one of the physical indicators on the dial of the electric mechanical wristwatch, the one of the physical indicators is set to an adjustable state.

3. The method according to claim 2, wherein the first hand gesture comprises a single click on one physical indicator on the dial of the electric mechanical wristwatch.

4. The method according to claim 2, wherein when the user makes a second hand gesture at the dial of the electric mechanical wristwatch, the position of the one or more physical indicators is adjusted and thereby adjusting the time.

5. The method according to claim 4, wherein the second hand gesture comprises a whirling motion, which indicates a direction of the one or more physical indicators is adjusted corresponding thereto.

6. The method according to claim 4, wherein when the user makes a third hand gesture at the dial of the electric mechanical wristwatch, the time circuit is informed to control the driving motor.

7. The method according to claim 6, wherein the third hand gesture comprises a double click on the dial of the electric mechanical wristwatch.

8. The method according to claim 6, wherein the first hand gesture, the second hand gesture, and the third hand gesture are different gestures.

9. A time adjusting system for an electric mechanical wristwatch, which comprises a time circuit, one or more physical indicators disposed on a dial of the electric mechanical wristwatch, and a driving motor connected to the one or more physical indicators, the one or more physical indicators being actuated and rotated by the driving motor according to a control signal outputted from the time circuit, said time adjusting system comprising:
   a motion sensor having a camera disposed on the electric mechanical wristwatch, for detecting a hand gesture made by a user in the front of the electric mechanical wristwatch and outputting a signal corresponding to the hand gesture made by the user for adjusting a position of the one or more physical indicators.

10. The system according to claim 9, wherein when the user makes a first hand gesture at one of the physical indicators on the dial of the electric mechanical wristwatch, the motion sensor outputs the signal so as to make the one of the physical indicators enter an adjustable state.

11. The system according to claim 10, wherein the first hand gesture comprises a single click on one physical indicator on the dial of the electric mechanical wristwatch.

12. The system according to claim 10, wherein when the user makes a second hand gesture at the dial of the electric mechanical wristwatch, the motion sensor outputs the signal so as to adjust the position of the physical indicator and thereby adjusting the time.

13. The system according to claim 12, wherein the second hand gesture comprises a whirling motion, which indicates a direction the one or more physical indicators is adjusted corresponding thereto.

14. The system according to claim 12, wherein when the user makes a third hand gesture at the dial of the electric mechanical wristwatch, the motion sensor outputs the signal so as to inform the time circuit to control the driving motor.

15. The system according to claim 14, wherein the third hand gesture comprises a double click on the dial of the electric mechanical wristwatch.

16. The system according to claim 14, wherein the first hand gesture, the second hand gesture, and the third hand gesture are different gestures.

17. The system according to claim 9, wherein the motion sensor comprises:
   the camera, for capturing an image;
   a gesture recognition module receiving the image captured by the camera, for recognizing the hand gesture made by the user in the front of the electric mechanical wristwatch; and
   a processor connected to the gesture recognition module, for outputting a corresponding signal based on the result from the gesture recognition module.

* * * * *